United States Patent [19]

Vogel

[11] 4,136,389
[45] Jan. 23, 1979

[54] FUEL CONSUMPTION RATE INDICATING SYSTEM FOR A VEHICLE

[75] Inventor: John D. Vogel, Brecksville, Ohio

[73] Assignee: Cummins Engine Company, Inc., Columbus, Ind.

[21] Appl. No.: 828,726

[22] Filed: Aug. 29, 1977

[51] Int. Cl.² .............................................. G01F 9/02
[52] U.S. Cl. ...................................... 364/442; 73/114
[58] Field of Search .................. 364/442; 73/114, 116, 73/112, 113, 115

[56] References Cited

U.S. PATENT DOCUMENTS

| | | | |
|---|---|---|---|
| 3,921,444 | 11/1975 | Taira et al. | 364/442 X |
| 3,927,305 | 12/1975 | Gruhl | 364/442 |
| 3,967,097 | 6/1976 | Moretti | 364/442 |
| 3,972,224 | 8/1976 | Ingram | 364/442 X |
| 3,975,952 | 8/1976 | Lacher, Jr. et al. | 364/442 X |
| 3,983,372 | 9/1976 | Klaver | 364/442 |
| 4,008,607 | 2/1977 | Ooiwa et al. | 364/442 X |
| 4,012,949 | 3/1977 | Lanz | 364/442 X |
| 4,050,295 | 9/1977 | Harvey | 364/442 X |
| 4,054,781 | 10/1977 | Kuno et al. | 364/442 |

Primary Examiner—Edward J. Wise
Attorney, Agent, or Firm—Merriam, Marshall & Bicknell

[57] ABSTRACT

This disclosure deals with a system for indicating to the driver of a vehicle the operating efficiency of a vehicle. The system senses the speed of the vehicle and a characteristic of the fuel supply system which is indicative of the fuel consumption. These two factors are combined in a dividing circuit which produces a signal indicating the fuel consumption rate which is a measure of the operating efficiency. This signal is fed to an indicator which displays the fuel consumption rate to the operator of the vehicle.

15 Claims, 6 Drawing Figures

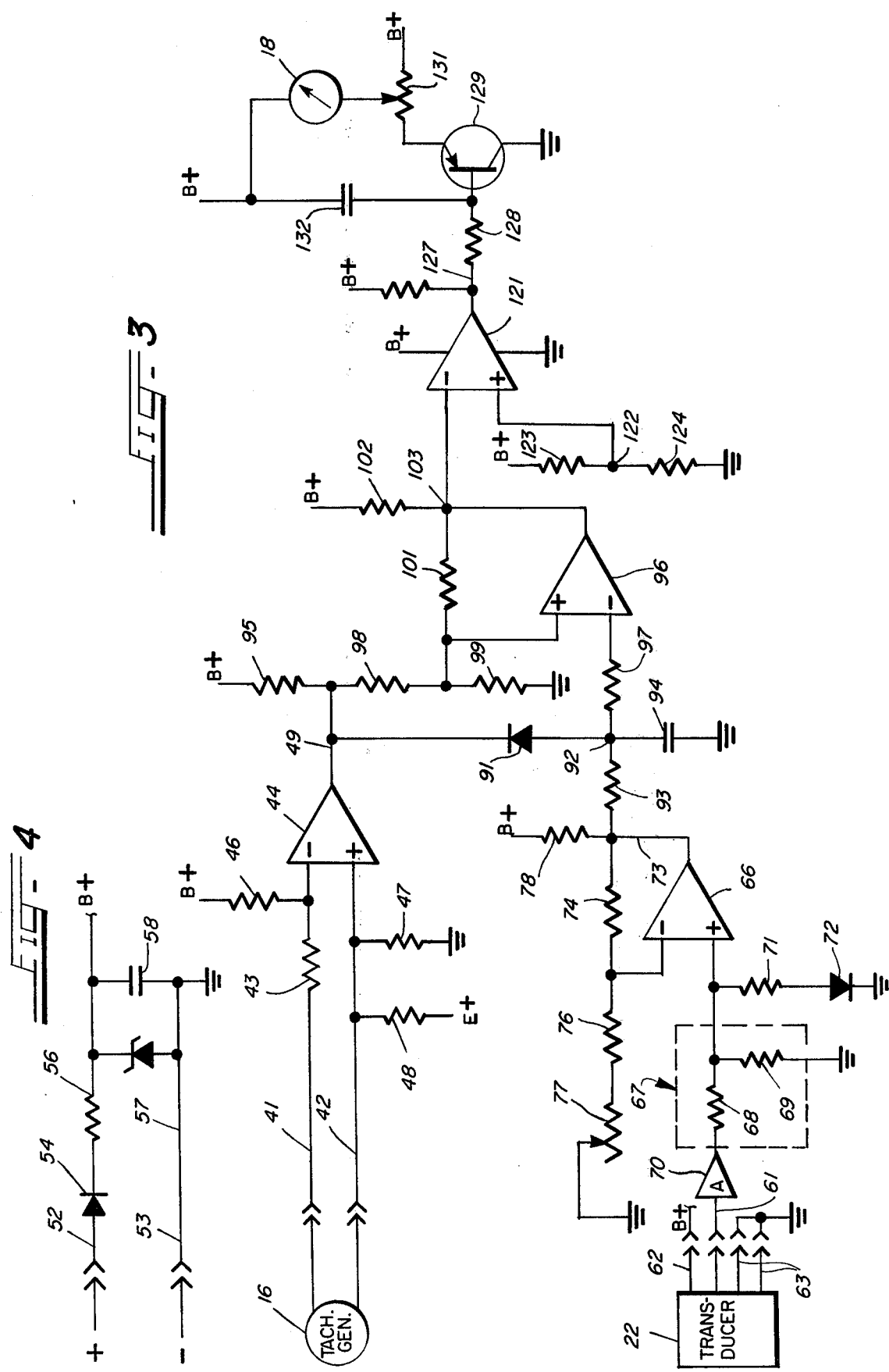

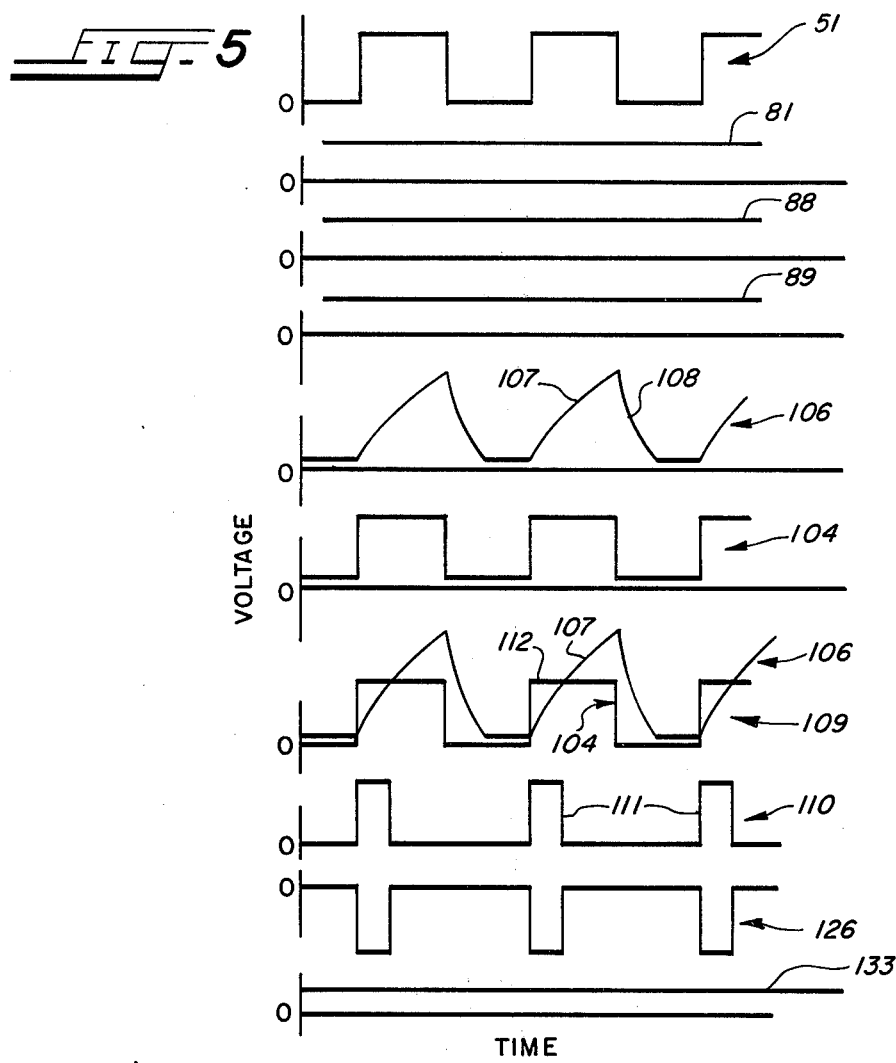
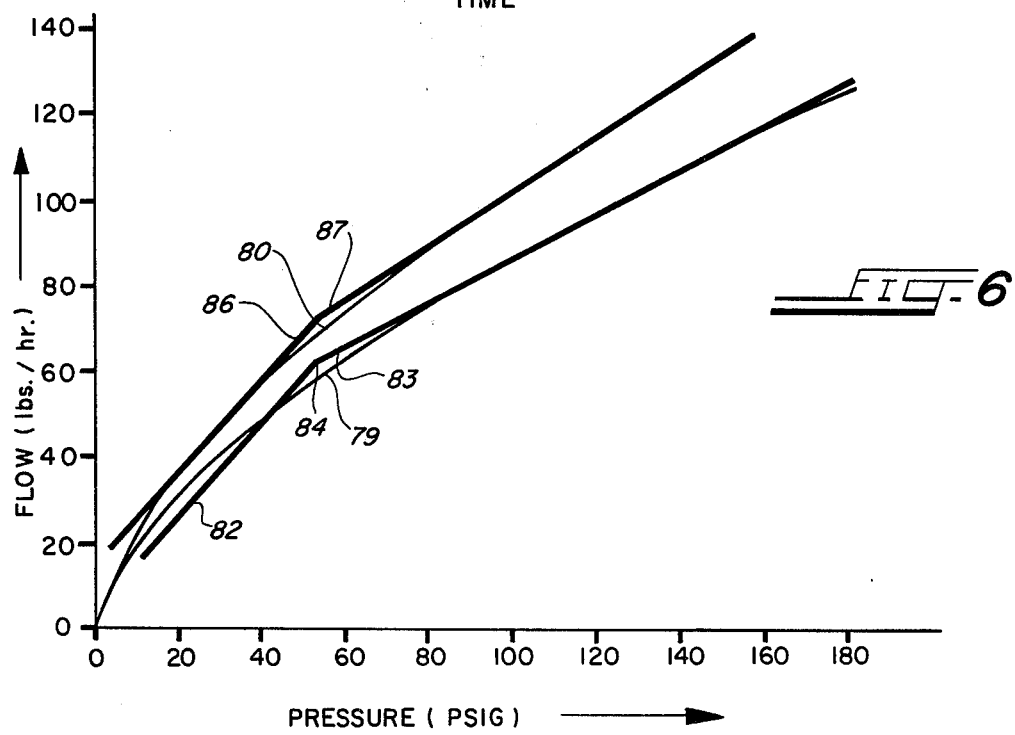

FUEL CONSUMPTION RATE INDICATING SYSTEM FOR A VEHICLE

U.S. Patent application Ser. No. 717,775 now U.S. Pat. No. 4,062,230 discloses a system for measuring and displaying the fuel consumption rate of a vehicle powered by an internal combustion engine. The system senses an engine operating parameter that is related to the amount of fuel consumed by the engine, and the distance traveled by the vehicle, calculates a figure based on the quantity of fuel consumed and the distance traveled, and displays this information to the driver of the vehicle.

It is a general object of this invention to provide an improvement on the above-described system.

It is a further object to provide an improved system which is capable of withstanding the temperatures and harsh operating conditions encountered in a vehicle such as a truck.

A system in accordance with the present invention is designed for use in a vehicle powered by an internal combustion engine, the engine including a fuel supply system wherein the rate of fuel consumption is controlled by adjusting the pressure in a fuel supply rail of the engine. The system includes means for sensing speed and generating a speed signal representative of the speed of the vehicle, means for sensing fuel pressure and generating a pressure signal representative of the pressure of the fuel in the supply rail, means for converting the pressure signal to a flow signal representing the fuel consumption rate of the engine, divider means for combining the speed signal and the flow signal and producing a signal representing the fuel consumption of the vehicle, and indicator means responsive to the last mentioned signal for indicating the fuel consumption to the operator of the vehicle.

The foregoing and other objects and advantages of the present invention will become more apparent from the following detailed description taken in conjunction with the accompanying figures of the drawings, wherein:

FIGS. 3 and 4 show detailed schematic electrical circuits of the system;

FIG. 5 is a schedule of waveforms illustrating the operation of the circuit shown in FIG. 3; and FIG. 6 shows curves illustrating the operation of a part of the system.

Figure 1:
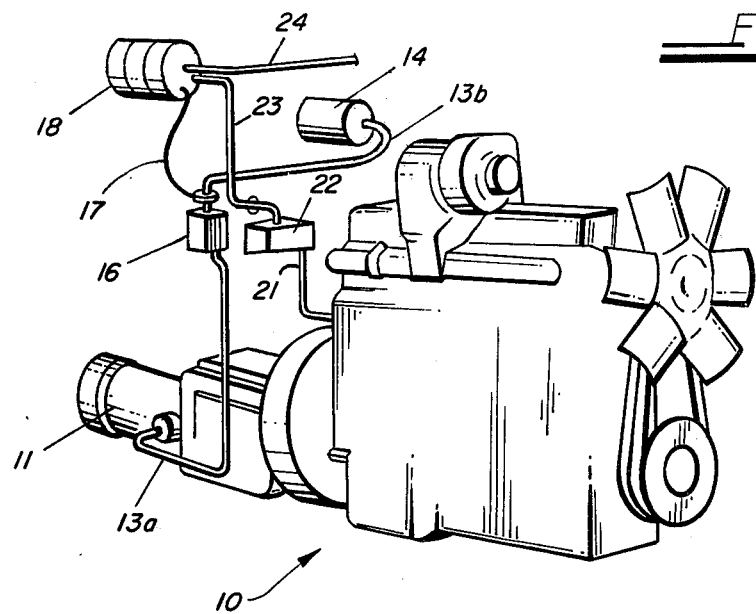
FIG. 1 is a perspective view of an internal combustion engine for a vehicle, including a fuel consumption rate indicating system in accordance with the invention.

With reference to FIG. 1, the reference numeral 10 indicates an internal combustion engine for a vehicle, the engine having a fuel supply system wherein the quantity of the fuel consumed by the engine is related to the pressure in a fuel supply rail, and the fuel quantity is controlled by adjusting the fuel pressure. Fuel supply systems of this type are described, for example, in U.S. Pat. Nos. 2,727,503; 2,749,897 and 3,159,152. The engine 10 may be a compression ignition type including fuel injectors, as described in the foregoing patents. The power output from the engine is taken from a power output shaft of a transmission 11, and a speedometer cable made up of two sections 13a and 13b is connected between the output shaft and a speedometer and odometer 14 which indicates the speed of the vehicle and also the total distance traveled by the vehicle. The engine 10 is for example connected to power a wheeled vehicle such as a highway truck. Connected in the cable, between the sections 13a and 13b is a cable connector 16 which includes a device such as a tachometer that generates an output signal representative of the speed of the vehicle. The output signal of the tachometer is connected by a wire 17 to a unit that includes the electronic circuitry of the system and an indicator 18.

The system further includes a fuel line 21 that is connected to the fuel supply rail of the fuel system, and to a transducer 22. The transducer 22 generates a signal on a conductor 23 that is a function of the fuel pressure in the line 21. The electronic circuitry in the unit 18 is connected to the conductor 23 and to another conductor 24 which receives power from, for example, the twelve volt battery of the vehicle.

Figure 2:
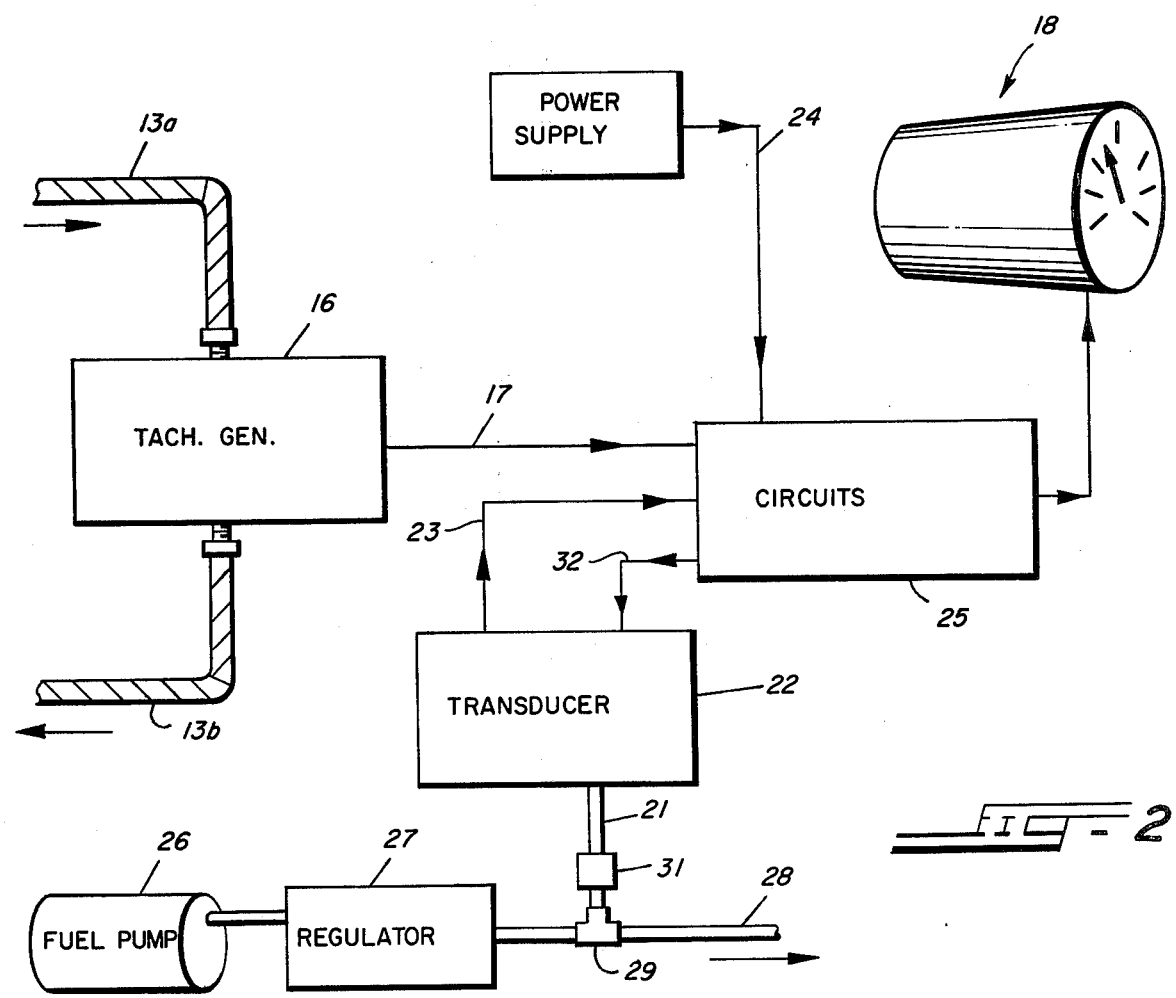
FIG. 2 is a block diagram of the system.

FIG. 2 is a further illustration of the parts of the system. The engine fuel supply system includes a fuel supply pump 26, a fuel flow regulator 27 that responds to engine speed, and a supply rail 28 which carries the fuel to the combustion chambers of the engine. A T coupling 29 is connected in the supply rail 28 and to a porous plug 31 which is also connected to the line 21. The plug minimizes pulsations at the transducer 22. The signal on the line 23 is connected to the electronic circuitry 25, and another line 32 between the circuitry 25 and the transducer 22 supplies power to the transducer 22.

Considering the operation of the parts illustrated in FIGS. 1 and 2, the tachometer 16 supplies a signal on the line 17 which has a frequency that is representative of the rate of rotation of the power output shaft 11 and the vehicle wheels. Since the wheel diameter of a vehicle is know, the velocity or speed of the vehicle and the distance travelled by it over a given length of time are known and indicated by the usual vehicle speedometer and odometer. The pressure of the fuel in the supply system is sensed and converted to a signal that represents the rate at which fuel is being consumed. The speed signal and the fuel consumption rate signal are combined by the electronic circuitry 25 to produce a signal representing the fuel consumption rate, which is a measure of the efficiency of the vehicle. This last signal is displayed by the indicator which is mounted on the dashboard of the vehicle. Consequently, the driver is continuously apprised of the miles-per-gallon value and he can adjust his driving to obtain the optimum efficiency. The value varies as either the vehicle velocity or the fuel consumption is varied, whereby the indicator displays a dynamic value, or a continuous reading, of the fuel consumption rate.

FIG. 4 is a detailed schematic diagram of the electronic circuitry of the system. The tachometer generator 16 generates a sine wave signal on two output lines 41 and 42. The line 41 is connected through a resistor 43 to the negative input of an operational amplifier 44, while the line 42 is connected directly to the positive input of the amplifier 44. The negative input of the amplifier 44 is also connected by a resistor 46 to B+, and the positive input is connected by one resistor 47 to ground and by another resistor 48 to B+. Thus, a continuous supply of DC current flows through the lines 41 and 42 even when the rotor of the tachometer 16 is not turning, this current being, of course, quite small. When the rotor of the generator 16 rotates in response to movement of the vehicle, the sine wave signal is superposed on the small DC current, and the frequency of the signal varies as a linear function of the speed of the vehicle.

The operational amplifier 44 operates as a square wave generator. The output signal of the amplifier 44 appears on an output line 49 and is represented by the square wave 51 shown in FIG. 5. The square wave varies between approximately ground potential and the B+ voltage of the supply, and its frequency is, of course, the same as the frequency of the sine wave signal out of the generator 16.

A B+ supply for the system is illustrated in FIG. 4 and includes two conductors 52 and 53 which are adapted to be connected to a DC supply such as a 12 volt vehicle battery. The conductor 52 is connected through a diode 54 and a resistor 56 to one side of a zener diode 57, and the conductor 53 is connected to the other side of the zener diode 57. A capacitor 58 is connected in parallel with the zener diode 57. The output of the power supply is taken from across the capacitor 58 and consists of a regulated DC supply potential of, in the present example, approximately 8.2 volts. The purpose of the diode 54 is to prevent damage to the system in the event the power supply is connected to the battery with the wrong polarity.

The transducer 22 produces a DC voltage on an output line 61, the voltage magnitude being a linear function of the pressure in the fuel lines 21 and 28. In the present instance, the transducer 22 consists of a linear variable differential transformer (LVDT) which includes a ferromagnetic slug that is movable between two differential coils connected in opposition. The slug is attached to a diaphragm which is exposed to the fuel pressure in the lines 21 and 28. As the fuel pressure in the line 21 varies, the slug moves relative to the two coils and changes the DC voltage which appears on the conductor 61. The transducer 22 further includes a B+ input 62 and two terminals 63 which are connected to ground. With a B+ voltage of approximately 8.2 volts as previously described, the voltage on the output conductor 61 varies between approximately 0.2 volt and plus four volts DC in response to a fuel pressure variation between approximately 0 and 300 pounds per square inch. Further, this variation in the voltage on the conductor 61 is essentially linear with the variation in the pressure.

The output signal on the conductor 61, represented by the line 81 in FIG. 5, is fed to the positive input of an operational amplifier 66 through a removable plug 67. Contained in the plug 67 is a first resistor 68 that is connected in the line 61, and a second resistor 69 which is connected between the positive input and ground. A third resistor 71 is connected in series with a diode 72 and between the positive input and ground.

A variable DC amplifier 70 may be connected in the line 61 ahead of the plug 67, and, if amplification is deemed necessary, the amplification factor may be adjusted to provide the desired voltage level at the input to the plug 67.

A feedback resistor 74 is connected between the output 73 of the amplifier 66 and its negative input, and the negative input is also connected by a fixed resistor 76 and a variable resistor 77 to ground. The output 73 of the operational amplifier 66 is also connected by a fixed resistor 78 to B+.

Operational amplifier 66, thus connected, operates as a differential amplifier, with the voltage on the negative input being the reference input. The voltage on the output 73 is a function of the difference between the two input voltage, and is represented by the line 89 in FIG. 5. Resistor 77 is made variable so that the gain of the amplifier 66 may be adjusted, and the value of the resistor 77 is preferably adjusted to provide at least a small DC output voltage regardless of the voltage levels at the two inputs of the amplifier 66. The gain ratio of the amplifier 66 is determined by the ratio of the sum of the resistors 76 and 77, to the resistor 74, and the resistor 77 may be used to vary the gain of the amplifier and the voltage offset. With a voltage variation on the positive input between approximately zero and two volts, the output voltage varies from approximately one to eight volts.

As previously mentioned, the straight line 81 (FIG. 5) represents the voltage appearing on the conductor 61, which is proportional to the fuel pressure. This voltage is converted to a voltage 88 which is representative of the rate of fuel consumption by the engine, the conversion being accomplished by the resistors 68, 69 and 71 and by the diode 72. At very low voltages on the output conductor 61, such, for example, as 0.3 volt, the potential on the positive input of the amplifier 66 is not high enough to bias the diode 72 on. In the present example, the diode 72 is chosen having a breakover voltage of approximately 0.6 volt. Consequently, at the low voltage, the resistor 71 is not in the circuit. When the potential on the line 61 rises to the level where the diode 71 is forward biased, the resistor 71 is in parallel with the resistor 69, thus producing a change in the voltage characteristic on the positive input of the amplifier 66.

With reference to FIG. 6, the curve 79 represents the variation of the mass of fuel consumed by the engine as a function of the pressure in the rail 28. This curve may be derived empirically for a given type of engine. Associated with the curve 79 are two straight line curve segments 82 and 83. The segment 82 represents the voltage on the positive input of the amplifier 66 when the diode 72 is biased off and the segment 83 represents the voltage when the diode 72 is biased on. The break point 84 between the two segments 82 and 83 occurs when the breakover voltage of the diode 72 is reached. The values of the resistors 68, 69 and 71 are chosen so that the straight line segment 82 corresponds generally to the shape of the lower portion of the curve 79 and the other straight line segment 83 corresponds generally to the upper portion of the curve 79. Thus, the two straight line segments 82 and 83 are correlated generally to the curvature of the fuel flow rate line 66.

Similarly, the curve 80 represents the fuel consumption-pressure characteristics of another type of engine. Two straight lines segments 86 and 87 are shown which correlate generally with the lower and upper portions of the curve 80. The values of the straight line segments 86 and 87 are different from the values of the segments 82 and 83 because different values are chosen for the resistors 68 and 69. Since the resistors 68 and 69 are contained in the removable plug 67, a selection of removable plugs may be provided having resistors of different values so that a close approximation or correlation with the pressure-flow curves of different engines may be obtained.

The output 49 of the amplifier 44 is connected by a diode 91 to a node 92, and the output 73 of the amplifier 66 is connected to the node 92 by a resistor 93. The diode 91 has its anode connected to the node 92 and its cathode is connected to the output 49. The node 92 is connected to one side of a capacitor 94 which has its other side connected to ground, and the node 92 is further connected to the negative input of another operational amplifier 96 through a resistor 97. The positive input of the amplifier 96 is connected to the junction of two resistors 98 and 99 which are connected in series between the output 49 of the amplifier 44 and ground. The output 49 is also connected to B+ through a resistor 95. The output of the amplifier 96 is connected to a node 103 which is connected to B+ through a resistor 102. A feedback resistor 101 connects the node 103 with the positive input.

The amplifier 96, thus connected, operates as a comparator, and the potential at the node 103 depends on the value of the voltage at the positive input of the amplifier 96 as compared with the voltage at the negative input. The voltage at the positive input, represented by the square wave 104, FIG. 5, follows the square wave output of the amplifier 44 although at a reduced voltage level.

When the voltage on the output 49 of the amplifier 44 is at the high positive potential, the diode 91 is reversed biased and does not conduct. The capacitor 94 then charges as current flows along the path from ground, through the capacitor 94, the node 92, the resistor 93 and to the output 73 of the amplifier 66. The capacitor 94 thus charges to the voltage level of the signal 89. When the square wave on the output 49 of the amplifier 44 is at ground potential and the node 92 is at a positive value due to the charge on the capacitor 94, the diode 91 is forward biased and conducts. The capacitor 94 then discharges through the node 92, the diode 91 and into the low voltage output of the amplifier 44, and it fully discharges in each cycle. The wave form 106 in FIG. 5 represents the sawtooth voltage across the capacitor 94, which is also the voltage at the node 92 and at the negative input of the amplifier 96. The curved rising portion 107 of the curve 106 occurs during the time that the capacitor 94 is charging through the resistor 93, and the falling portion 108 occurs during the time that the capacitor 94 is discharging through the diode 91. The values of the capacitor 94 and the resistor 93 are chosen so that the capacitor 94 charges relatively slowly, but the capacitor 94 discharges quite rapidly during the portion 108 due to the lower resistance path through the diode 91 and the output of the amplifier 44. In the present illustration, the sawtooth wave form 106 varies between minimum voltage of approximately 0.8 volt and a peak value of the voltage level at the output 73 of an amplifier 66. Since the voltage at the output 73 is a function of the fuel flow rate, the peak voltage value of the sawtooth signal 106 will also be a function of the fuel flow rate.

The square wave 104 appears on the positive output of the amplifier 96 and the sawtooth wave 106 appears on the negative input of the amplifier 96. The resistors 98 and 99 are chosen to make the high value of the wave 104 always higher than the minimum value of the wave 106. The reference numeral 109 of FIG. 5 shows these two wave forms superimposed. The output 103, represented by the wave 110 in FIG. 5, of the comparator amplifier 96 will be at a high level whenever the value of the wave 104 is greater than the value of the wave 106. Since the two waves 104 and 106 cross each other in each cycle, the wave 110 consists of a series or train of rectangular pulses 111.

Since the peak value of the sawtooth wave form 106 is a function of the fuel flow rate, it will become apparent that the widths of the pulses 111 are also a function of the fuel flow rate. If the potential at the output 73 of the amplifier 66 is relatively high, the rising portion 107 of the wave 106 will increase at a relatively rapid rate to a high peak value and it will cross the high flat portion 112 of the wave 104 at a relatively early time in each cycle. This produces a narrow width pulse 111. On the other hand, if the potential at the output 73 is quite low, the rising portion 107 rises relatively slowly to a low peak value and the length of time required for the rising portion 107 to cross the flat portion 112 will be relatively long. Consequently, the width of the pulses 111 is an inverse function of the fuel flow rate. Further, the frequency, or the period, of the pulses 111 is also a function of the rate of rotation of the power output shaft 11 and the vehicle velocity. As the speed of the shaft 11 increases, the time period between the pulses 111 will decrease and the frequency of the pulses will increase. Consequently, the time period between the pulses 111 is an inverse function of the speed of the vehicle. The voltage signal 110 at the node 103 has two characteristics which are functions of the engine speed and of the rate of consumption of the fuel by the engine.

The peak value of the wave 106 should always be greater than the maximum value of the wave 104, and the minimum value of the wave 106 should always be greater than the minimum value of the wave 104. Regardless of how low the fuel pressure is and how high the frequency of the signal 104 is, the width of the pulses 110 should not be greater than 50% of the duty cycle.

The node 103 is connected to the negative input of another operational amplifier 121 which is connected to operate as an inverter. The positive input of the amplifier 121 is connected to the junction 122 of two resistors 123 and 124 which are connected between B+ and ground. The output signal 126 (FIG. 5) of the amplifier 121 appears on a conductor 127 which is also connected through a resistor 128 to the base of a transistor 129. The collector of the transistor 129 is connected to ground and the emitter of the transistor 129 is connected through a variable resistor 131 to B+. The base of the transistor 129 is also connected through a capacitor 132 to B+, and the meter 18 is connected between B+ and the wiper of the variable resistor 131. The train of negative going pulses of the signal 126 appear across the capacitor 132 which charges to the average value of the signal 126. This average value is represented by the line 133 and appears on the base of the transistor 129. The average value is a function of the width of the pulses 111 (representative of the unit of fuel quantity per hour consumed by the engine) divided by the period between the pulses 111 (representative of the unit of distance per hour traveled of the vehicle). This division therefore produces a signal representing the fuel consumption rate of the vehicle. The value of the signal 133, of course, controls the amplification of the transistor 129 and the amount of current flowing through the meter 18. Thus, the amount of current flowing through the meter 18 is proportional to the voltage signal 133, which in turn, is a function of the average value of the signal 126. The resistor 131 may be varied to produce a full scale deflection of the needle of the meter at, for example, a maximum current of 10 milliamps.

To summarize briefly the operation of the system, the rotating tachometer generator 60 produces a sine wave signal having a frequency that is a function of the speed of the vehicle which, in turn, is a function of the distance traveled by the vehicle over a unit length of time. The sine wave is converted to a square wave 51 which appears at the output 49. At the same time, the transducer 22 produces a DC voltage that is proportional to the pressure in the fuel supply system and this voltage is converted to a fuel flow rate signal by the components 68, 69, 71 and 72. The amplifier 66 produces a substantially steady DC voltage at its output which is proportional to the fuel flow rate. The capacitor 94 is alternately charged and discharged at the frequency as the signal 51, and the amplifier 96 produces a signal 110 that is a function both of the vehicle speed and of the fuel consumption rate. The signal 110 is inverted and then averaged by the capacitor 132, and the meter or indicator 18 provides an indication of the unit of distance traveled by the vehicle for each unit of quantity or mass of fuel consumed. The indicator or meter which displays the fuel consumption rate may of course be calibrated in the English system of miles per gallon or in the metric system of kilometers per liter. Further, instead of measuring and indicating the fuel consumption rate in terms of distance per quantity of fuel consumed, the opposite arrangement may be provided where gallon per mile or liter per kilometer is measured and displayed. The latter figure is commonly used in continental Europe.

While the foregoing description has been concerned with the fuel consumption rate of a truck, it should be apparent that a system in accordance with the invention is usable in other types of vehicles and with engines other than diesel engines. The values of the electrical components of the circuits will have to be selected to suit each type of engine and fuel supply characteristic. The following are the values of some of the components in a specific example of the engine:

| Component | Value | Component | Value |
|---|---|---|---|
| R-68 | 47K | R-95 | 15K |
| R-69 | 56K | R-98 | 100K |
| R-71 | 47K | R-99 | 10K |
| R-77 | 10K | R-97 | 100K |
| R-76 | 8.2K | R-131 | 1K |
| R-74 | 47K | | |
| R-78 | 6.8K | C-94 | .047 u.f. |
| R-93 | 470K | C-132 | 100 u.f. |

It will be apparent from the foregoing that a novel and useful system has been provided. The indicator 18 provides the driver of the vehicle with an up-to-date accurate indication of, in the present example, the miles per gallon figure of the vehicle. Since the miles per gallon figure is variable with engine speed and road operating conditions, an experienced operator can vary the speed of the vehicle and adjust the gear ratio in order to obtain the most efficient operation of the vehicle and to optimize the fuel consumption rate. This produces the highly advantageous results of reducing the cost of operating the vehicle and also of conserving fuel.

The divider circuit of the system, which includes the capacitor 94, the resistor 93, the diode 91, the amplifier 96, and the components connected to the amplifier 96, is highly advantageous. The circuit produces consistant predictable results and it is not temperature sensitive. This last factor is, of course, highly important in a system designed for use in a vehicle. The system measures the fuel consumption rate by sensing fuel pressure, which is also highly advantageous. It is difficult accurately to measure fuel flow because, to do so, a sensor would have to be mounted on the engine and it would have to be able to withstand the high engine operating temperatures. Further, a flow sensor would have to be able to compensate for air in the fuel and for by-pass fuel flow. All of these problems are avoided by using a pressure sensor and converting the pressure signal to a flow signal. The use of a removable plug in the converter circuit makes it possible to adopt a basic system to a number of different types of engines.

What is claimed is:

1. A system for measuring and indicating the fuel consumption rate of a vehicle powered by an internal combustion engine, the engine including a fuel supply system wherein the fuel consumption is a function of the pressure of the fuel supplied to the combustion chambers, comprising first means for sensing the fuel pressure and providing a first signal representing the pressure, second means responsive to movement of the vehicle and providing a second signal representing the movement, third means connected to receive said first signal and to convert said first signal to a third signal representing the fuel consumption, a fourth means connected to receive said second and third signals and to provide a fourth signal having one characteristic representing vehicle speed and another characteristic representing the fuel consumption, and fifth means receiving said fourth signal and indicating the fuel consumption rate of the vehicle.

2. A system according to claim 1, wherein said third means comprises a differential amplifier having a first input connected to a reference signal, said amplifier further including a second input, a conductor connected to said second input and to receive said first signal and impedance means connected to said conductor for converting said first signal to said third signal.

3. A system according to claim 1, wherein said fourth signal comprises a train of pulses, said one characteristic being the amplitude of said pulses and said other characteristic being the period of said pulses.

4. A system for measuring and indicating the fuel consumption rate of a vehicle powered by an internal combustion engine, comprising first means responsive to the speed of the vehicle and generating an alternating speed signal having a frequency that is a function of the speed of the vehicle, second means adapted to be connected to the fuel supply of the engine and generating a rate signal representative of the fuel consumption of the engine, and divider circuit means receiving said speed signal and said consumption signal and providing a fuel consumption rate signal, said divider circuit means including a capacitor, a charge path to said second means for charging said capacitor to a value that is a function of said consumption signal, a discharge path to said first means for periodically discharging said capacitor at said frequency of said speed signal, and comparator means responsive to said speed signal and to the charge on said capacitor for providing said fuel consumption rate signal.

5. A system according to claim 4, wherein said consumption signal is a steady DC voltage for a given fuel consumption, and said capacitor is periodically charged to the value of said consumption signal.

6. A system according to claim 5, wherein said speed signal alternates between a high value and a low value, said discharge path including a diode, and said diode being alternately biased on and off by said high and low values of said speed signal.

7. A system responsive to the movement and the fuel consumption rate of a vehicle powered by an internal combustion engine, the engine including a fuel supply system of the character wherein fuel consumption is controlled by adjusting the fuel pressure, comprising first means adapted to be connected in said fuel supply system of the engine and responsive to the fuel pressure in said system for generating a first signal that is representative of the fuel pressure and consumption of the engine, second means responsive to movement of the vehicle and generating a second signal that is representative of the movement of the vehicle, and circuit means receiving said first and second signals, processing said signals, and indicating vehicle performance information to the driver of the vehicle related to the vehicle movement and fuel consumption, said circuit means including driver means receiving said first and said second signals and dividing one of said signals by the other of said signals.

8. A system for measuring and indicating the fuel consumption rate of a vehicle powered by an internal combustion engine, the engine including a fuel supply system, comprising first means adapted to be connected to the engine and generating a consumption signal that is representative of the fuel consumption of the engine, second means for sensing movement of the vehicle and generating a speed signal that is representative of the speed of the vehicle, divider means receiving said consumption and said speed signals and dividing one of said signals by the other of said signals, and indicator means receiving and indicating the quotient of said division, the fuel supply system being of the character wherein the fuel consumption is controlled by adjusting the fuel pressure, said first means including a transducer adapted to sense said fuel pressure and to provide a voltage signal representative of said pressure.

9. A system according to claim 8, and further including converter means connected to receive said voltage signal and to convert it to a signal representing the fuel consumption rate.

10. A system according to claim 8, wherein said first means further includes a differential amplifier and a conductor connecting said transducer to an input of said amplifier, and said converter means comprises a first resistor connected in said conductor, a second resistor connected between said conductor and a reference potential, a third resistor connected between said conductor and said reference potential, and a diode connected in series with said third resistor.

11. A system according to claim 10, wherein said first and second resistors are contained in a removable plug.

12. A system for measuring and indicating the fuel consumption rate of a vehicle powered by an internal combustion engine, the engine including a fuel supply system, comprising first means adapted to be connected to the engine and generating a consumption signal that is representative of the fuel consumption of the engine, second means for sensing movement of the vehicle and generating a speed signal that is representative of the speed of the vehicle, divider means receiving said consumption and said speed signals and dividing one of said signals by the other of said signals, and indicator means receiving and indicating the quotient of said division, said speed signal alternating between high and low values at a frequency that is a function of the speed of the vehicle, and said divider means comprising charge storage means connected to be charged by said consumption signal to a value representing said fuel consumption, said charge storage means further being connected to said speed signal and being periodically discharged at the frequency of said speed signal, whereby the peak value of the charge on said charge storage means is a function of the fuel consumption and the period between alternate charges and discharges is a function of speed.

13. A system according to claim 12, and further including means for averaging the charge on said charge storage means, and indicator means for displaying said average charge.

14. A system according to claim 12, wherein said divider means further includes comparator means having first and second inputs and an output, said first input being connected to receive a function of said speed signal and said second input being connected to respond to the charge on said charge storage means, whereby a signal appears on said output consisting of a train of pulses having an amplitude representing said fuel consumption and a period representing said speed.

15. A system according to claim 12, wherein the signal on said first input is train of substantially square pulses and the signal on said second input is a train of substantially sawtooth pulses, said square and sawtooth pulses coinciding and the maximum and minimum values of said sawtooth pulses being greater than the maximum and minimum values of said square pulses.

* * * * *